United States Patent
Burgess et al.

(10) Patent No.: US 8,892,623 B2
(45) Date of Patent: Nov. 18, 2014

(54) DATA PROCESSING APPARATUS AND METHOD

(75) Inventors: Neil Burgess, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 342 days.

(21) Appl. No.: 13/523,204

(22) Filed: Jun. 14, 2012

(65) Prior Publication Data

US 2013/0339412 A1 Dec. 19, 2013

(51) Int. Cl.
*G06F 7/509* (2006.01)

(52) U.S. Cl.
USPC .......................................................... 708/709

(58) Field of Classification Search
None
See application file for complete search history.

(56) References Cited

U.S. PATENT DOCUMENTS

| | | | | |
|---|---|---|---|---|
| 7,467,176 B2* | 12/2008 | Zheng et al. | ................... | 708/551 |
| 7,587,444 B2* | 9/2009 | McDaniel et al. | ............ | 708/709 |
| 7,822,799 B1* | 10/2010 | Langhammer et al. | ........ | 708/551 |
| 8,615,543 B1* | 12/2013 | Zheng et al. | ................... | 708/551 |
| 2006/0242221 A1* | 10/2006 | McDaniel et al. | ............ | 708/700 |
| 2007/0186079 A1* | 8/2007 | Sih et al. | ........................ | 712/210 |
| 2013/0339412 A1* | 12/2013 | Burgess et al. | ................ | 708/209 |

* cited by examiner

*Primary Examiner* — David H Malzahn
(74) *Attorney, Agent, or Firm* — Nixon & Vanderhye P.C.

(57) ABSTRACT

Processing circuitry is provided for performing a shift-round-and-accumulate operation. The operation comprises shifting an input value to generate a shifted value using shifting circuitry, adding the shifted value to an accumulate value using adding circuitry, and performing rounding by adding a rounding value to the sum of the shifted value and the accumulated value using the adding circuitry. The same adding circuitry is used to perform both the addition of the shifted value and the accumulated value and the addition of the rounding value in the same processing cycle.

22 Claims, 10 Drawing Sheets

CROSSBAR SWITCH CONTROL
(if signed = 0, S = 0 and if signed = 1, S = sign bit of input value)

| shift type | size | shf_l | dist[5:3] | L7 | R7 | L6 | R6 | L5 | R5 | L4 | R4 | L3 | R3 | L2 | R2 | L1 | R1 | L0 | R0 |
|---|---|---|---|---|---|---|---|---|---|---|---|---|---|---|---|---|---|---|---|
| 8-bit elements, left shift, shift amount 0-7 | 00 | 1 | 000 | i7 | 0/i7 | i6 | 0/i6 | i5 | 0/i5 | i4 | 0/i4 | i3 | 0/i3 | i2 | 0/i2 | i1 | 0/i1 | i0 | 0/i0 |
| 8-bit elements, right shift, shift amount 0-7 | 00 | 0 | 000 | S/i7 | i7 | S/i6 | i6 | S/i5 | i5 | S/i4 | i4 | S/i3 | i3 | S/i2 | i2 | S/i1 | i1 | S/i0 | i0 |
| 16-bit elements, left shift, shift amount 0-7 | 01 | 1 | 000 | i7 | i7 | i6 | 0/i6 | i5 | i5 | i4 | 0/i4 | i3 | i3 | i2 | 0/i2 | i1 | i1 | i0 | 0/i0 |
| 16-bit elements, left shift, shift amount 8-15 | 01 | 1 | 001 | i6 | 0/i7 | S/i6 | 0/i6 | i4 | 0/i5 | S/i4 | 0/i4 | i2 | 0/i3 | S/i2 | 0/i2 | i0 | 0/i1 | S/i0 | 0/i0 |
| 16-bit elements, right shift, shift amount 0-7 | 01 | 0 | 000 | S/i7 | i7 | i7 | i6 | S/i5 | i5 | i5 | i4 | S/i3 | i3 | i3 | i2 | S/i1 | i1 | i1 | i0 |
| 16-bit elements, right shift, shift amount 8-15 | 01 | 0 | 001 | S/i7 | S/i7 | S/i6 | i7 | S/i5 | S/i5 | S/i4 | i5 | S/i3 | S/i3 | S/i2 | i3 | S/i1 | S/i1 | S/i0 | i1 |
| 32-bit elements, left shift, shift amount 0-7 | 10 | 1 | 000 | i7 | i7 | i6 | i6 | i5 | i5 | i4 | 0/i4 | i3 | i3 | i2 | i2 | i1 | i1 | i0 | 0/i0 |
| 32-bit elements, left shift, shift amount 8-15 | 10 | 1 | 001 | i6 | i7 | i5 | i6 | i4 | i5 | S/i4 | 0/i4 | i2 | i3 | i1 | i2 | i0 | i1 | S/i0 | 0/i0 |
| 32-bit elements, left shift, shift amount 16-23 | 10 | 1 | 010 | i5 | 0/i7 | i4 | 0/i6 | S/i4 | 0/i5 | S/i4 | 0/i4 | i1 | 0/i3 | i0 | 0/i2 | S/i0 | 0/i1 | S/i0 | 0/i0 |
| 32-bit elements, left shift, shift amount 24-31 | 10 | 1 | 011 | i4 | 0/i7 | S/i4 | 0/i6 | 0/i5 | 0/i5 | 0/i4 | 0/i4 | i0 | 0/i3 | S/i0 | 0/i2 | 0/i1 | 0/i1 | 0/i0 | 0/i0 |
| 32-bit elements, right shift, shift amount 0-7 | 10 | 0 | 000 | S/i7 | i7 | i7 | i6 | i6 | i5 | i5 | i4 | S/i3 | i3 | i3 | i2 | i2 | i1 | i1 | i0 |
| 32-bit elements, right shift, shift amount 8-15 | 10 | 0 | 001 | S/i7 | S/i7 | S/i6 | i7 | i7 | i6 | i6 | i5 | S/i3 | S/i3 | S/i2 | i3 | i3 | i2 | i2 | i1 |
| 32-bit elements, right shift, shift amount 16-23 | 10 | 0 | 010 | S/i7 | S/i7 | S/i6 | S/i6 | S/i5 | i7 | i7 | i6 | S/i3 | S/i3 | S/i2 | S/i2 | S/i1 | i3 | i3 | i2 |
| 32-bit elements, right shift, shift amount 24-31 | 10 | 0 | 011 | S/i7 | S/i7 | S/i6 | S/i6 | S/i5 | S/i5 | S/i4 | i7 | S/i3 | S/i3 | S/i2 | S/i2 | S/i1 | S/i1 | S/i0 | i3 |
| 64-bit element, left shift, shift amount 0-7 | 11 | 1 | 000 | i7 | i7 | i6 | i6 | i5 | i5 | i4 | i4 | i3 | i3 | i2 | i2 | i1 | i1 | i0 | 0/i0 |
| 64-bit element, left shift, shift amount 8-15 | 11 | 1 | 001 | i6 | i7 | i5 | i6 | i4 | i5 | i3 | i4 | i2 | i3 | i1 | i2 | i0 | i1 | S/i0 | 0/i0 |
| 64-bit element, left shift, shift amount 16-23 | 11 | 1 | 010 | i5 | i7 | i4 | i6 | i3 | i5 | i2 | i4 | i1 | i3 | i0 | i2 | S/i0 | i1 | 0/i1 | 0/i0 |
| 64-bit element, left shift, shift amount 24-31 | 11 | 1 | 011 | i4 | i7 | i3 | i6 | i2 | i5 | i1 | i4 | i0 | i3 | S/i0 | i2 | 0/i1 | i1 | 0/i1 | 0/i0 |
| 64-bit element, left shift, shift amount 32-39 | 11 | 1 | 100 | i3 | i7 | i2 | i6 | i1 | i5 | i0 | i4 | S/i0 | i3 | 0/i2 | i2 | 0/i1 | i1 | 0/i1 | 0/i0 |
| 64-bit element, left shift, shift amount 40-47 | 11 | 1 | 101 | i2 | i7 | i1 | i6 | i0 | i5 | S/i0 | i4 | 0/i3 | i3 | 0/i2 | i2 | 0/i1 | i1 | 0/i1 | 0/i0 |
| 64-bit element, left shift, shift amount 48-55 | 11 | 1 | 110 | i1 | i7 | i0 | i6 | S/i0 | i5 | 0/i4 | i4 | 0/i3 | i3 | 0/i2 | i2 | 0/i1 | i1 | 0/i1 | 0/i0 |
| 64-bit element, left shift, shift amount 56-63 | 11 | 1 | 111 | i0 | i7 | S/i0 | i6 | 0/i5 | i5 | 0/i4 | i4 | 0/i3 | i3 | 0/i2 | i2 | 0/i1 | i1 | 0/i1 | 0/i0 |
| 64-bit element, right shift, shift amount 0-7 | 11 | 0 | 000 | S/i7 | i7 | i7 | i6 | i6 | i5 | i5 | i4 | i4 | i3 | i3 | i2 | i2 | i1 | i1 | i0 |
| 64-bit element, right shift, shift amount 8-15 | 11 | 0 | 001 | S/i7 | S/i7 | S/i6 | i7 | i7 | i6 | i6 | i5 | i5 | i4 | i4 | i3 | i3 | i2 | i2 | i1 |
| 64-bit element, right shift, shift amount 16-23 | 11 | 0 | 010 | S/i7 | S/i7 | S/i6 | S/i6 | S/i5 | i7 | i7 | i6 | i6 | i5 | i5 | i4 | i4 | i3 | i3 | i2 |
| 64-bit element, right shift, shift amount 24-31 | 11 | 0 | 011 | S/i7 | S/i7 | S/i6 | S/i6 | S/i5 | S/i5 | S/i4 | i7 | i7 | i6 | i6 | i5 | i5 | i4 | i4 | i3 |
| 64-bit element, right shift, shift amount 32-39 | 11 | 0 | 100 | S/i7 | S/i7 | S/i6 | S/i6 | S/i5 | S/i5 | S/i4 | S/i4 | S/i3 | i7 | i7 | i6 | i6 | i5 | i5 | i4 |
| 64-bit element, right shift, shift amount 40-47 | 11 | 0 | 101 | S/i7 | S/i7 | S/i6 | S/i6 | S/i5 | S/i5 | S/i4 | S/i4 | S/i3 | S/i3 | S/i2 | i7 | i7 | i6 | i6 | i5 |
| 64-bit element, right shift, shift amount 48-55 | 11 | 0 | 110 | S/i7 | S/i7 | S/i6 | S/i6 | S/i5 | S/i5 | S/i4 | S/i4 | S/i3 | S/i3 | S/i2 | S/i2 | S/i1 | i7 | i7 | i6 |
| 64-bit element, right shift, shift amount 56-63 | 11 | 0 | 111 | S/i7 | S/i7 | S/i6 | S/i6 | S/i5 | S/i5 | S/i4 | S/i4 | S/i3 | S/i3 | S/i2 | S/i2 | S/i1 | S/i1 | S/i0 | i7 |

Table 1 Control bits for shift & round operation (ac[63:0] set to all '0's)

| Size | rnd7 | mx7 | rnd6 | mx6 | rnd5 | mx5 | rnd4 | mx4 | rnd3 | mx3 | rnd2 | mx2 | rnd1 | mx1 | rnd0 |
|---|---|---|---|---|---|---|---|---|---|---|---|---|---|---|---|
| 8-b  | 0/1 | 0 | 0/1 | 0 | 0/1 | 0 | 0/1 | 0 | 0/1 | 0 | 0/1 | 0 | 0/1 | 0 | 0/1 |
| 16-b | x   | 1 | 0/1 | 0 | x   | 1 | 0/1 | 0 | x   | 1 | 0/1 | 0 | x   | 1 | 0/1 |
| 32-b | x   | 1 | x   | 1 | x   | 1 | 0/1 | 0 | x   | 1 | x   | 1 | x   | 1 | 0/1 |
| 64-b | x   | 1 | x   | 1 | x   | 1 | x   | 1 | x   | 1 | x   | 1 | x   | 1 | 0/1 |

Table 2 Control bits for shift & accumulate operation

| Size | rnd7 | mx7 | rnd6 | mx6 | rnd5 | mx5 | rnd4 | mx4 | rnd3 | mx3 | rnd2 | mx2 | rnd1 | mx1 | rnd0 |
|---|---|---|---|---|---|---|---|---|---|---|---|---|---|---|---|
| 8-b  | 0 | 0 | 0 | 0 | 0 | 0 | 0 | 0 | 0 | 0 | 0 | 0 | 0 | 0 | 0 |
| 16-b | x | 1 | 0 | 0 | x | 1 | 0 | 0 | x | 1 | 0 | 0 | x | 1 | 0 |
| 32-b | x | 1 | x | 1 | x | 1 | 0 | 0 | x | 1 | x | 1 | x | 1 | 0 |
| 64-b | x | 1 | x | 1 | x | 1 | x | 1 | x | 1 | x | 1 | x | 1 | 0 |

Table 3 Control bits for shift, round & accumulate operation

| Size | rnd7 | mx7 | rnd6 | mx6 | rnd5 | mx5 | rnd4 | mx4 | rnd3 | mx3 | rnd2 | mx2 | rnd1 | mx1 | rnd0 |
|---|---|---|---|---|---|---|---|---|---|---|---|---|---|---|---|
| 8-b  | 0/1 | 0 | 0/1 | 0 | 0/1 | 0 | 0/1 | 0 | 0/1 | 0 | 0/1 | 0 | 0/1 | 0 | 0/1 |
| 16-b | x   | 1 | 0/1 | 0 | x   | 1 | 0/1 | 0 | x   | 1 | 0/1 | 0 | x   | 1 | 0/1 |
| 32-b | x   | 1 | x   | 1 | x   | 1 | 0/1 | 0 | x   | 1 | x   | 1 | x   | 1 | 0/1 |
| 64-b | x   | 1 | x   | 1 | x   | 1 | x   | 1 | x   | 1 | x   | 1 | x   | 1 | 0/1 |

DATA PROCESSING APPARATUS AND METHOD

BACKGROUND OF THE INVENTION

1. Field of the Invention

The present invention relates to the field of data processing. More particularly, the present invention relates to a data processing apparatus and method for performing a shift-round-and-accumulate operation.

2. Description of the Prior Art

A data processing apparatus may perform an operation in which a data value is shifted to the left or right by a given number of bit positions and then added to an accumulate value. The result of the addition may be used as the accumulate value for a subsequent shift-and-accumulate operation. In this way, a sequence of different input values can be added together with the shift operation aligning successive input values with the accumulated value.

After shifting a value, it may be desirable to round the shifted value. For example, right shifting a binary value X by n bit positions to generate a shifted value y is functionally equivalent to dividing X by $2^n$ and rounding down to the nearest integer less than $X/2^n$. However, if the actual value of $X/2^n$ lies closer to y+1 than y, then it may sometimes be preferable to obtain the result y+1. Therefore, depending on the value of $X/2^n$ and the preferred rounding technique, the shifted value y may optionally be incremented to round the shifted value y to the value y+1. There may also be other reasons why rounding is desired. Typically, rounding is performed by adding a rounding value of 1 to the shift result.

If one wishes to perform an operation including a shift, an addition of the shifted value to the accumulate value, and a rounding operation, this would typically require the execution of several different instructions over three processing cycles: one cycle to perform the shift, one cycle to perform the rounding and one cycle to perform the accumulation. The present invention seeks to make this operation more efficient.

SUMMARY OF THE INVENTION

Viewed from one aspect the present invention provides a data processing apparatus comprising:

processing circuitry comprising shifting circuitry for shifting data values and adding circuitry for adding data values; and control circuitry configured to control said processing circuitry to perform a shift-round-and-accumulate operation in response to execution of a shift-round-and-accumulate instruction;

said shift-round-and-accumulate operation comprising:
(i) shifting an input value to generate a shifted value using said shifting circuitry;
(ii) adding said shifted value to an accumulate value using said adding circuitry; and
(iii) performing rounding by adding a rounding value to the sum of said shifted value and said accumulate value using said adding circuitry;

wherein said adding circuitry is configured to add the shifted value to the accumulate value and add the rounding value in the same processing cycle.

The present technique provides processing circuitry which can be controlled to perform a shift-round-and-accumulate operation in response to execution of a shift-round-and-accumulate instruction. The shift-round-and-accumulate operation comprises shifting an input value to generate a shifted value, adding the shifted value to an accumulate value and performing rounding by adding a rounding value to the sum of the shifted value and the accumulated value. The addition of the shifted value to the accumulate value and the addition of the rounding value are performed in the same processing cycle by the same adding circuitry. Therefore, the present technique can perform a shift-round-and-accumulate operation in fewer cycles and with fewer instructions than the previous technique.

To be able to add the shifted value to the accumulate value and also add the rounding value in the same processing cycle, the adding circuitry would need to add three different values together. However, adders would usually add only two values. However, the present technique recognises that adders also have a carry input for inputting a carry bit to be added to a least significant bit of the sum of the values being added by the adding circuitry. Since typically the rounding value is also a single bit to be added to the least significant bit of the sum of the shifted value and accumulate value, then the present technique recognises that the carry input can be reused to input the rounding value to the adder. In this way, the adding circuitry is able to add all three values (the shifted value, the accumulate value and the rounding value) together within the same processing cycle.

The control circuitry may control the processing circuitry to use a result value of the shift-round-and-accumulate operation as the accumulate value for a following shift-round-and-accumulate operation. Hence, repeated iterations of the shift-round-and-accumulate operation can repeatedly add different values into the accumulate value at respective positions determined by the shift applied by the shifting circuitry.

The value of the rounding value may be dependent on at least one shifted-out bit of the input value that is not present in the shifted value generated by the shifting circuitry. For example, with a right shift, the rounding value may take the value of the most significant shifted-out bit (the bit of the input value lying one place to the right of the bit that becomes the least significant bit of the shifted value), so that the shifted value is rounded to the integer lying nearest to the fraction which would be obtained if the input value was divided by $2^n$, where n is the number of places by which the input value has been shifted. Alternatively, the shifting circuitry may apply a left shift. The shifted value need not represent all the bits of the result of the shift (for example, only a subset of the shifted bits may be selected). In this case, the rounding value may correspond to the bit lying one place to the right of the selected subset of bits.

The present technique enables other types of operation to be performed with the same hardware in the same number of cycles as the shift-round-accumulate instruction. For example, it may not always be desired to perform an accumulation or to perform rounding. Therefore, a shift-and-round instruction may be provided for controlling the processing circuitry to perform a shift-and-round operation, without accumulation. This operation may be performed in the same way as the shift-round-and-accumulate operation, but with the accumulate value set to zero. Similarly, if rounding is not desired, then a shift-and-accumulate instruction may be used to trigger the processing circuitry to perform a shift-and-accumulate operation which is performed in the same way as the shift-round-and-accumulate operation, but with the rounding value set to zero. Also, a shift operation may be implemented by performing the shift-round-and-accumulate operation with both the accumulate value and the rounding set to zero. Therefore, the present technique enables a range of different operations to be performed on one piece of circuitry with the same latency. This saves area and time in performing these operations compared with a system which uses different circuitry to perform the different operations.

Therefore, it will be appreciated that, although subsequent parts of this application will generally describe performing the shift-round-and-accumulate operation, this implicitly also describes how to perform the shift-and-round, shift-and-accumulate and shift operations which can be performed in the same way but with one or both of the accumulate value and rounding value set to zero.

In some examples, the input value, shifted value, accumulate value and result value of the shift-round-and-accumulate operation may represent just a single data element.

However, the present technique may also be applied to a single-instruction-multiple data (SIMD) system in which data values comprising multiple data elements are processed, with the shift-round-and-accumulate operation being applied in parallel to each data element. By increasing the number of independent data values which can be processed in parallel, processing performance can be improved with SIMD.

In some SIMD systems, the size and number of data elements may be fixed. However, more flexibility may be provided by allowing the number and size of the elements to be varied. The control circuitry may select the number of data elements and the size of the data elements based on a variable parameter of the shift-round-and-accumulate instruction.

In some embodiments the number of data elements and size of the data elements may be controlled independently from one another. The data elements need not all have the same size. However, configuration of the processing circuitry may be simpler if all the data elements are the same size. For example, the processing circuitry may be able to handle a given number of bits in total (e.g. 64 bits), with those bits being divided in different ways into $2^n$ bit data elements (e.g. one 64-bit element, two 32-bit elements, four 16-bit elements, or eight 8-bit elements). In this case, a single parameter in the shift-round-and-accumulate instruction may be enough to identify both the number of data elements and the size of the data elements, since the size of the data elements would implicitly identify the number of data elements, and vice versa.

To enable a SIMD implementation, the shifting circuitry may comprise a plurality of shifting units, with each shifting unit arranged to operate on at least a portion of a data element of the input value to generate a corresponding portion of a data element of the shifted value. If the data elements are of the same size as the number of bits which a single shifting unit can process then each shifting unit may operate on a whole data element. On the other hand, when data elements larger than the width of the shifting units are being processed, then several adjacent shifting units may operate on different portions of the same data element in parallel with each other, to achieve the overall effect of shifting a data element larger than the width of a shifting unit.

When multiple data elements are processed in the shift-round-and-accumulate operation, separate rounding values may be generated for each data element of the shifted value. For example, the shifting circuitry may generate a corresponding rounding value for each data element of the shifted value in dependence on at least one shifted-out bit of the corresponding input data element that no longer appears in the data element of the shifted value.

Also, the adding circuitry may comprise a plurality of adding units, with each adding unit being arranged to operate on at least a portion of a data element of the shifting value and accumulate value to generate a corresponding portion of a data element of the result value. The adding units may be connected in a chain with a carry output of a preceding adding unit connected to a carry input of a following adding unit. This enables multiple adding units to perform an addition for a data element which is wider than the width of a single adding unit. The carry bit resulting from the addition of one adding unit is passed to another adding unit to ensure that the overall result data element obtained by the adding units has the correct sum value.

At least one multiplexer may be included in the chain of adding units. Each multiplexer may be connected between the carry output of a preceding adding unit and the carry input of a following adding unit. The multiplexers control which value is input to the carry input of the following adding unit, selecting between the carry value output from the carry output of the preceding adding unit, and the rounding value. In this way, the multiplexer can control whether the adding units operate collectively on different portions of the same data element with the carry being transferred between the units, or whether the adding units operate independently on different data elements with a rounding value being added.

In particular, if adjacent adding units are operating on different portions of the same data element, then the multiplexer connected between those adding units inputs the carry value from the preceding adding unit to the carry input of the following adding unit. This enables the adding units to act as a single adder. In contrast, if adjacent adding units are operating on different data elements, then the rounding value is input to the carry input of the following adding unit. There will never be a case where both the carry value and a rounding value are required, since the carry value is only transferred in the middle of a data element while the rounding value is only required at the least significant bit of the data element. It is this exclusive selection of either the carry value or the rounding value which enables the shift-round-and-accumulate operation to be implemented in a very efficient way in a SIMD environment, since the carry input which is not required at the start of each data element can be reused to input the rounding value, enabling the addition of the input value, the accumulate value and the rounding value to be performed in the same cycle by the same adding circuitry.

Although the adding circuitry may be implemented so that carry bits are rippled through the adding circuitry from one end to the other, this may not be efficient since the propagation of the carries from one end of the chain to the other may require a significant amount of time, limiting processing speed. To accelerate processing, carry forwarding circuitry may be provided to forward a carry output value of a first adding unit to the carry input of a second adding unit, bypassing at least one intervening adding unit. By allowing carries to bypass some adding units, the shift and round and accumulate operation may be performed more quickly since it is not necessary to wait for the carry to propagate through the intervening adding units.

To check whether it is appropriate for carries to bypass an intervening adding unit, the intervening adding unit may comprise a carry determining unit. The carry determining unit may determine a carry propagation value which has one of a first value and a second value. The first value indicates that the carry output value of the intervening adding unit is dependent on, and has the same value as, the carry output value of the first adding unit (the adding unit at the start of the bypass route). On the other hand, the second value indicates that the carry output value of the intervening adding unit is independent of the carry value output by the first adding unit. Based on the carry propagation value, the carry forwarding circuitry may determine whether it is appropriate for the carry to be forwarded from the first adding unit to the second adding unit bypassing the intervening adding unit.

If the carry propagation value has the first value, then forwarding is possible since the carry value to be input to the second adding unit will be the same as the carry output value of the first adding unit, so it is not necessary to wait for the addition performed by the intervening adding unit.

On the other hand, if the carry propagation value has the second value, then such forwarding is not possible since the carry output value of the intervening adding unit is independent of the carry output value of the first adding unit. Nevertheless, the carry determining unit may speed up processing by determining the carry output value which results from the addition performed by the intervening adding unit in parallel with the actual addition being performed, and passing this carry output value to the carry input of the second adding unit. Hence it is not necessary to wait for the actual addition to be completed in order to enable the carry value to be determined and input to the second adding unit downstream of the intervening adding unit.

The carry propagation value can be determined by examining the bits of the two values to be added by the intervening adding unit. For example, the carry determining unit may apply a bitwise XOR operation to the two values being added, and if the result of the XOR is a value containing all '1' bit values, then the carry value output for the intervening adding unit will have the same value as the carry value output for the first adding unit, and so the carry propagation value should be set to the first value. On the other hand, if the result of the XOR contains at least one '0' bit, then the carry output value of the intervening adding unit will be independent of the carry output value of the first adding unit and so the carry propagation value should have the second value.

The carry forwarding circuit may allow carries to bypass two or more intervening adding units. In this case, the carry forwarding circuitry may determine whether to bypass these intervening adding units by checking whether the carry propagation value for each of the intervening adding units has the first value.

Viewed from another aspect, the present invention provides a data processing apparatus comprising:

processing means for processing data, said processing means comprising shifting means for shifting data values and adding means for adding data values; and control means for controlling said processing circuitry to perform a shift-round-and-accumulate operation in response to execution of a shift-round-and-accumulate instruction;

said shift-round-and-accumulate operation comprising:
(i) shifting an input value to generate a shifted value using said shifting means;
(ii) adding said shifted value to an accumulate value using said adding means; and
(iii) performing rounding by adding a rounding value to the sum of said shifted value and said accumulate value using said adding means;
wherein said adding means is configured to add the shifted value to the accumulate value and add the rounding value in the same processing cycle.

Viewed from a further aspect, the present invention provides a method of performing a shift-round-and-accumulate operation, comprising the steps of:
(i) shifting an input value to generate a shifted value;
(ii) adding said shifted value to an accumulate value; and
(iii) performing rounding by adding a rounding value to the sum of said shifted value and said accumulate value;
wherein said adding of said shifted value to said accumulate value and said adding of said rounding value are performed by the same adding circuitry in the same processing cycle; and said method is performed in response to execution of a shift-round-and-accumulate instruction.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 shows an example of the way in which the crossbar switch of the shifting circuitry is controlled to output portions of the input value to each shifting unit for different types of shift operation;

DESCRIPTION OF EMBODIMENTS

Figure 1:
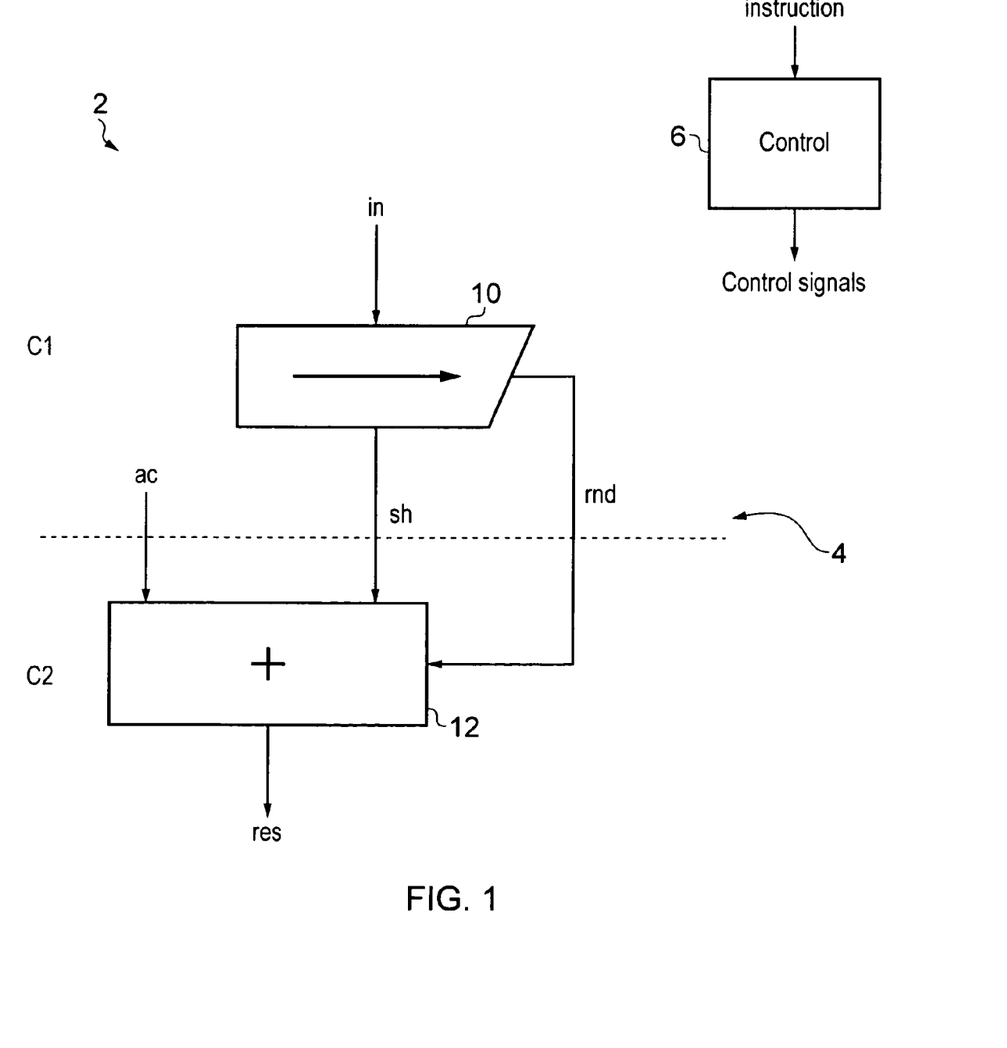
FIG. 1 schematically illustrates a portion of a data processing apparatus for performing a shift-round-and-accumulate operation.

FIG. 1 schematically illustrates a portion of a data processing apparatus 2 comprising processing circuitry 4 and control circuitry 6. The control circuitry 6 responds to program instructions by generating control signals for controlling the processing circuitry 4. FIG. 1 illustrates a portion of the processing circuitry 4 for executing four types of instruction: a shift instruction, a shift-and-round instruction, a shift-and-accumulate instruction and a shift-round-and-accumulate instruction.

The processing circuitry 4 includes shifting circuitry 10 and adding circuitry 12. In response to a shift-round-and-accumulate instruction, the control circuitry 6 controls the shifting circuitry 10 in a first processing cycle C1 to shift an input value in by a number of bit positions specified in the instruction, to generate a shifted value sh. In this example, the shifting circuitry 10 performs a right shift, but a left shift is also possible.

The shifting circuitry 10 also generates a rounding value rnd whose value depends on the bits of the original input value which are no longer part of the shifted value due to the shift applied by the shifter 10 (these bits may be referred to as shifted-out bits). For example, for a right shift the rounding value rnd may take the value of the most significant shifted out bit, while for a left shift, the rounding value may take the value of the most significant bit which lies to the right of the portion of the shift result taken as the shifted value (the shifted value sh need not include all bits of the result of shifting the input value in).

In a second processing cycle C2, the adding circuitry 12 adds the shifted value sh to an accumulate value ac and the rounding value rnd. The rounding value rnd is input as a carry bit to the adder 12 so that if the rounding value has a value of zero then the results res generated by the adder 12 is equal to the sum of the accumulate value ac and the shifter value sh (res=sh+ac), while if the rounding value rnd has a value of one then the result value res is equal to (sh+ac+1).

To execute the other kinds of instruction, the control circuitry 6 controls the processing circuitry 4 to perform the same shift-round-and-accumulate operation, but with one or both of the accumulate value ac and the rounding value rnd set to zero. For a shift instruction, both the accumulate value ac and the rounding value rnd are set to zero. For a shift-and-round instruction, the accumulate value is set to zero. For the shift-and-accumulate operation, the rounding value rnd is set to zero. Therefore, the present technique enables all of these operations to be performed efficiently using the same hardware and the same number of cycles as the shift-round-and-accumulate operation.

When an accumulate operation is performed, then the result value res generated by the adding circuitry 12 would typically be input as the accumulate value ac for a following iteration of the accumulate operation. This enables a series of input values to be shifted to a desired position by the shifting circuitry 10 and accumulated into the accumulate value by the adding circuitry 12.

Figure 2:
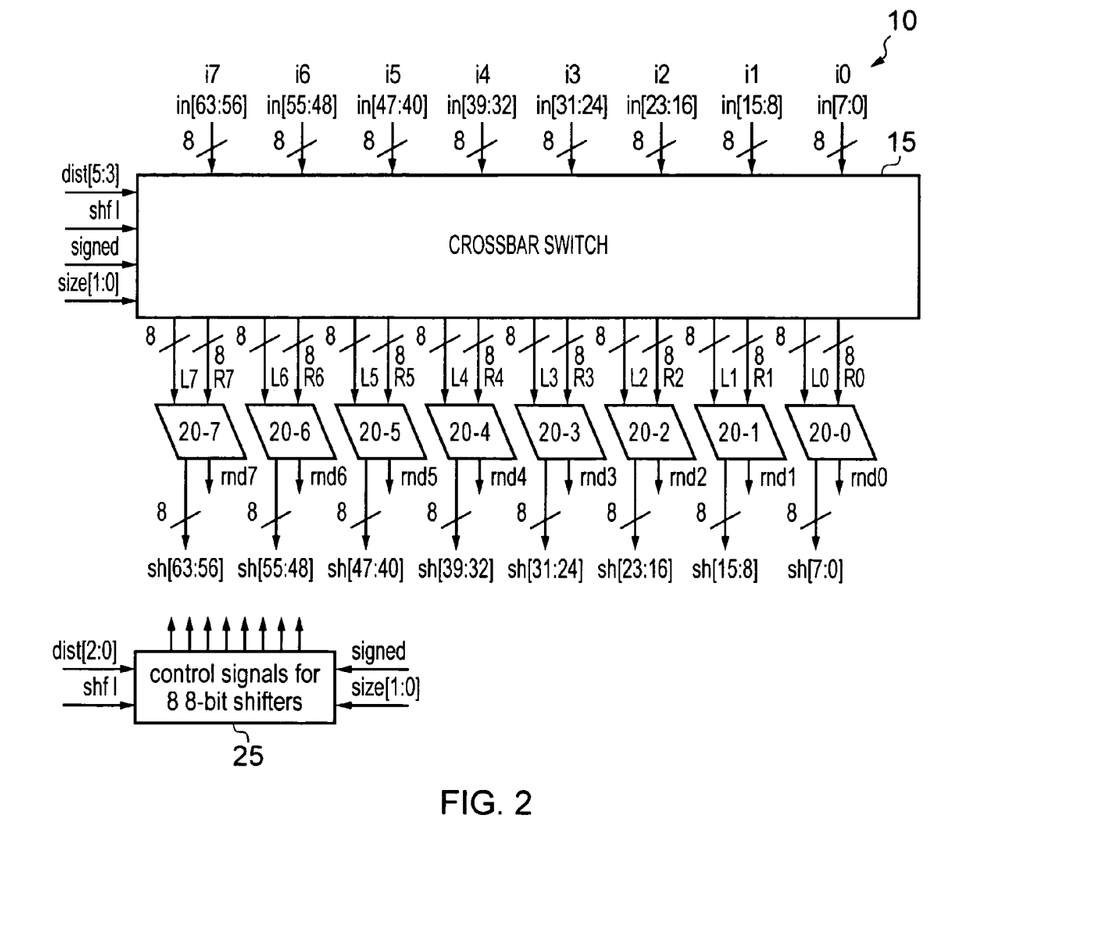
FIG. 2 shows an example of shifting circuitry including a crossbar switch and several shifting units.

FIG. 2 shows an example of the shifting circuitry 10, which enables SIMD data processing of an input value including multiple data elements. The shifting circuitry 10 includes a crossbar switch 15, eight shifting units 20-0 to 20-7 (the shifting units will generally be referred to as 20 unless a particular shifting unit is meant) and control circuitry 25 for generating control signals for controlling the shifting units 20.

The crossbar switch 15 controls which portions of the input value (in) are provided to each of the shifting units 20. Each shifting unit 20 receives two 8-bit signals L, R from the crossbar switch 15. For example, shifting unit 20-0 receives signals L0, R0, shifting unit 20-1 receives signals L1, R1, and so on. The crossbar switch 15 is able to connect each input L, R of each shifting unit 20 to any 8-bit portion (input byte) of the input value in. The crossbar switch 15 can also provide any input L, R of any shifting unit 20 with a byte of '0' bit values or a byte of sign bits S ('0' bit values if the input value is positive or '1' bit values if the input value is negative).

The shifting circuitry 10 receives various control signals which control the shifting operation being performed:
  "dist[5:0]" is a 6-bit binary number representing the number of places by which each data element of the input value in is shifted to generate the shifted value sh.
  "shf_I" is a 1-bit value indicating whether a left shift or a right shift is to be performed. In this example, '1' indicates a left shift and '0' indicates a right shift, but this could also be the other way round.
  "signed" is a 1-bit value indicating whether or not the input data is signed. In this example, '1' indicates that the input value is signed and '0' indicates that the input value is not signed.
  "size [1:0]" is a 2-bit value indicating the size of the data elements being operated upon by the shifting circuitry. In this example, '00' indicates 8-bit data elements, '01' indicates 16-bit data elements, '10' indicates 32-bit data elements, and '11' indicates 64-bit data elements, but a different mapping between the values of the size parameter and the data element sizes may also be used. The size of the data elements would be controlled by control circuitry 6 based on a variable parameter of the instruction being executed.

FIG. 3 shows a table showing an example of the way in which the crossbar switch 15 is controlled by these control signals to connect different input bytes of the input value to the left and right inputs L, R of the respective shifting units 20, for a range of different types of shift operation. For conciseness, the respective input bytes in[7:0] to in[63:56] of the input value have been labelled as i0-i7 in the way shown in FIG. 2.

The left hand portion of the table shows different types of shift operation and the values of control signals size, shf_I and dist[5:3] corresponding to each shift operation. For 8-bit, 16-bit and 32-bit data elements, the range of possible shift amounts is limited to values smaller than the data element size. The right hand portion of the table of FIG. 3 shows the values provided by the crossbar switch 15 to each input L7, R7, . . . , L0, R0 of the shifting units 20-0 to 20-7 for each type of shift.

Some inputs L, R of the shifting units 20 are shown in FIG. 3 as taking one of two alternative values (0/i or S/i). This is because the shift operation performed by the shifting circuitry 10 may be either a shift operation (non-rotated shift) or a rotate operation (rotated shift). The left-hand alternative value in the table of FIG. 3 corresponds to the value for the non-rotated shift, while the right-hand alternative value indicates the value for the rotated shift. For a rotate operation, the shifted-out bits of an input data element that are shifted out at one end of a data element are inserted into the other end of the data element as shifted-in bits, so in this case the signals L/R corresponding to the shifted-in bits each take the value of one of the input bytes i7-i0. On the other hand, for a shift operation without rotation, 0 bits or sign bits S are input into the data element as the shifted-in bits. 0 bits are used for left-shifts, while sign bits S are used for right-shifts. The sign bits S each have a value of 0 if the "signed" control signal is 0, and each have a value equal to the sign of the corresponding input data element if the "signed" control signal is 1 (i.e. 0 if positive or 1 if negative). Some shifting circuits 10 may only be able to perform either a non-rotated shift or a rotated shift, in which case only one of the alternatives shown in FIG. 3 would be provided. Other shifting circuits 10 may be able to perform both types of shift and may select which type of shift is performed based on a control input (not illustrated in FIG. 2).

As shown in FIGS. 2 and 3, the crossbar switch 15 provides each shifting unit 20 with 16 bits [15:0], of which bits [15:8] correspond to the left-hand input L for that shifting unit 20 and bits [7:0] correspond to the right-hand input R for that shifting unit 20. Each shifting unit 20 selects 8 bits of the 16 bits [15:0], and outputs the selected bits as the corresponding portion of the shifted value sh. The 8 bits are selected as follows:
  for a right shift (shf_I=0), each shifting unit 20 selects bits [7+x: x] of the 16 bits [15:0], where x is the decimal value corresponding to dist[2:0] (the least significant portion of the distance parameter "dist");
  for a left shift (shf_I=1), each shifting unit 20 selects bits [15-x: 8-x] of the 16 bits [15:0], where x is again the decimal value corresponding to dist[2:0].

Each shifting unit 20 also generates a corresponding rounding bit (rnd0-rnd7) based on the bits input to the shifting unit 20 which have not been selected for output. There are many ways in which the rounding bits can be generated. For example, with a right shift the rounding bit may simply be the most significant bit which was not selected by the shifting unit 20 (i.e. bit [x−1] of the 16 bits [15:0], where x is the decimal value corresponding to dist[2:0]). Alternatively, more of the shifted out bits may be considered to determine which value of the rounding bit to select, and different techniques may be used to determine whether to round up or down when a value lies halfway between two rounded values. Generally the rounding bit will be selected to have a value of 0 if the sum generated by the adding circuitry 12 is to be rounded down, and a value of 1 if the sum is to be rounded up.

For left shifts, the rounding value would generally be 0 if the data element size of the shifted value sh is the same size as the data element size of the input value in. However, in other embodiments it is possible for a shifter to produce shifted data elements of a smaller size to the input data elements, and in this case then when a left shift is performed it may be desirable to generate a rounding value of 0 or 1 depending on a shifted-out bit of the original input data element which does not appear in the smaller shifted data element.

Figure 4A:
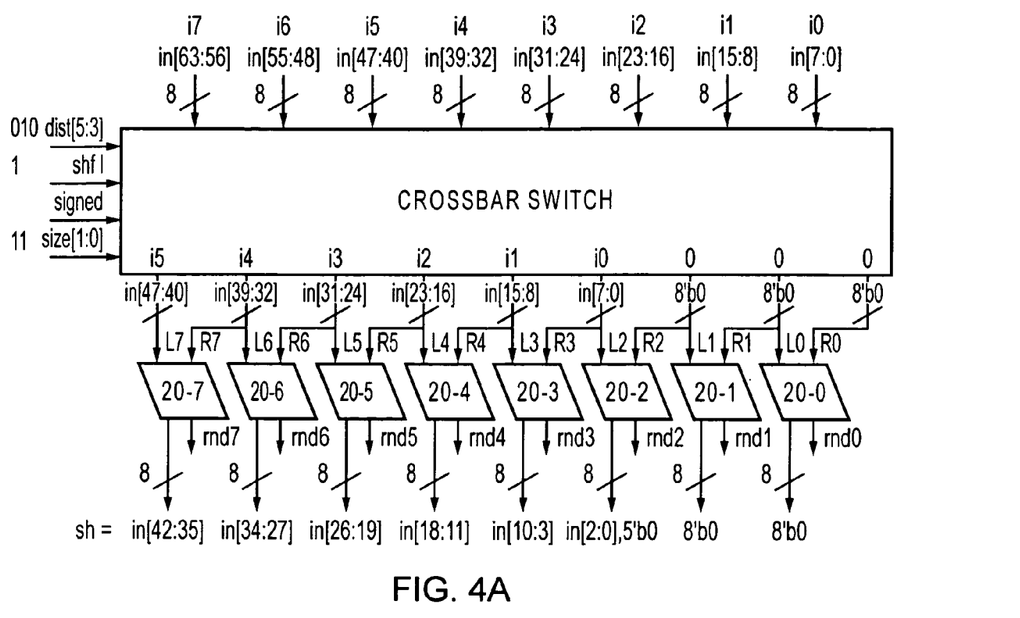
FIGS. 4A, 4B, 4C, 4D, 4E and 4F show examples of shift operations performed by the shifting circuitry.

FIG. 4A shows an example of left-shifting a 64-bit element by 21 places (i.e. dist[5:0]='010101'). The input bytes i0-i7 are mapped to the left-hand and right-hand inputs L, R of the shifting units 20 in the way shown in FIG. 3 for control signal values of size=11, shf_I=1, and dist[5:3]=010. As shown in FIG. 4A, adjacent shifting units 20 receive the same input byte (e.g. right-hand input R6 of shifting unit 20-6 and left-hand input L5 of shifting unit 20-5 both receive input byte i3), so that bits of that input byte are spread across the outputs of different shifting units 20. The inputs R2, L1, R1, L0, R0 are provided with bit values of 0 to represent the shifted-in bits for a non-rotated left-shift. As mentioned above, for a left shift each shifting unit 20 selects bits [15-x: 8-x] of the 16 bits provided by crossbar switch 15. In this case, dist[2:0]='101', i.e. x=5, and so each shifting unit 20 selects bits [15-5: 8-5] of the 16 bits provided, i.e. bits [10:3]. For example, shifting unit 20-7 receives as inputs the 16 bits [15:0] corresponding to in[47:32] (input bytes i5 and i4). Bits [10:3] of these bits correspond to in[42:35]. Hence, bits in[42:35] are output as the most-significant byte (sh[63:56]) of the shifted value sh. Similarly, each other shifting unit 20 selects bits [10:3] of the 16 bits input to that shifting unit 20 and outputs these bits as a corresponding byte of the shifted value sh. As shown in FIG. 4A, the resulting shifted value sh corresponds to the original 64-bit input data element left-shifted by 21 bit positions, with bit values of 0 being used to fill up the 21 shifted-in bits at the least significant portion of the shifted value.

Figure 4B:
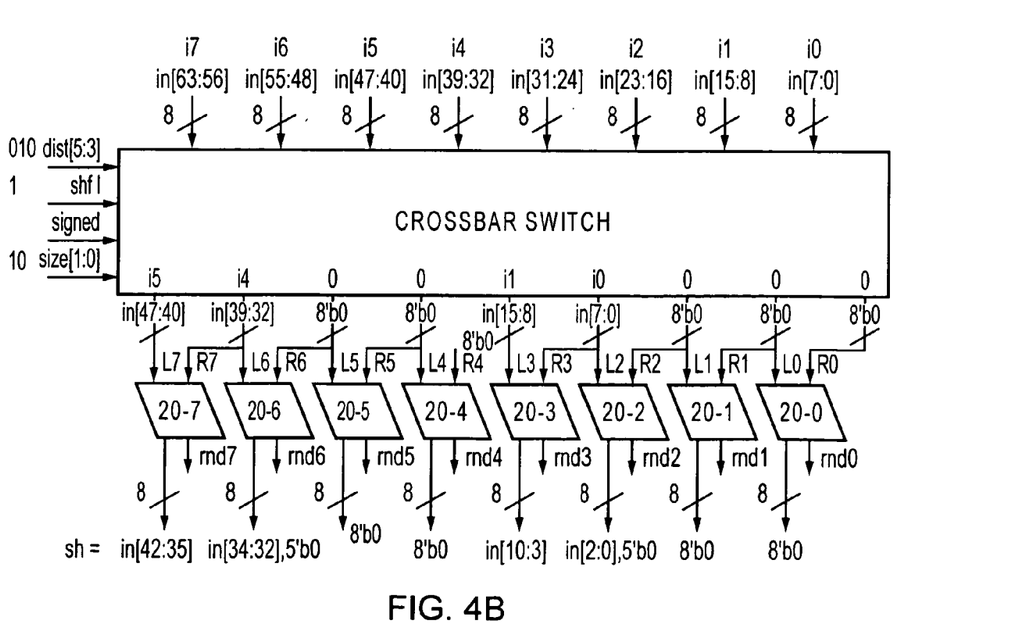

FIG. 4B shows an example of left-shifting two 32-bit elements by 21 places (again dist[5:0]='010101'). This time, the input bytes i0-i7 are mapped to the inputs L, R of the shifting units 20 in the way shown in FIG. 3 for control signal values size=10, shf_I=1, dist[5:3]='010'. As the upper and lower 32-bit portions now relate to different data elements, this time the right hand input R4 of shifting unit 20-4 and the left-hand input L3 of shifting unit 20-3 are controlled independently (as indicated by the thick line between these values in FIG. 3 for this type of shift). For each 32-bit data element, bytes of 0 values are input to the signal inputs R6, L5, R5, L4, R4, R2, L1, R1, L1, L0 at the least-significant portion of each data element, to represent the shifted-in bits. Each shifting unit 20 again selects bits [10:3] of the 16 bits [15:0] input to it from the crossbar switch 15. As shown in FIG. 4B, the result is a shifted value sh comprising two 32-bit elements, each of which has been left-shifted by 21 bit positions (e.g. bit [10] of the input value is now at bit [31] of the shifted value) with the least significant 21 bits being filled with 0 bit values.

Figure 4C:
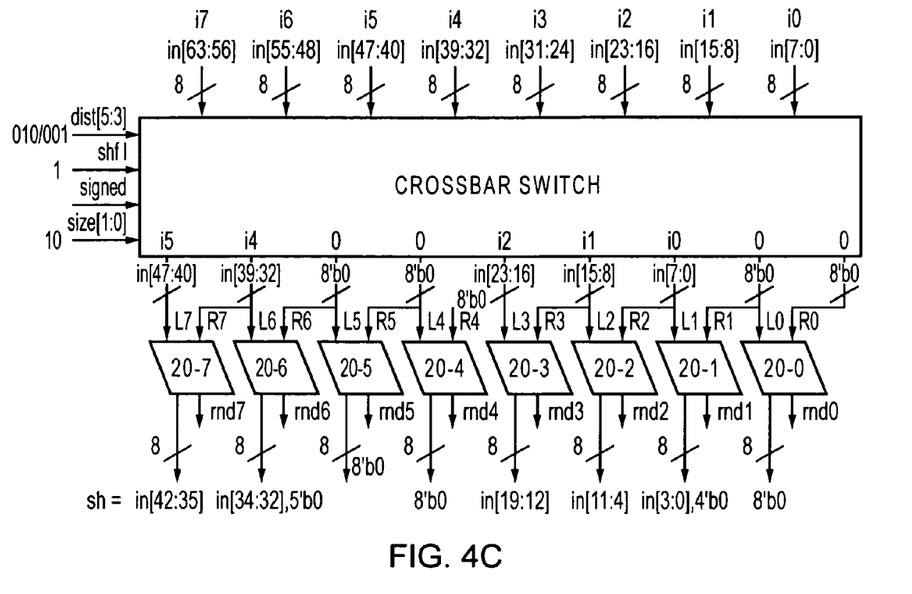

It is possible for different data elements to be shifted using different shift amounts. In this case, multiple distance parameters "dist" would need to be provided. FIG. 4C shows an example in which two 32-bit data elements are left-shifted, with the most significant element shifted by 21 places and the least significant element shifted by 12 places. In this case, the most significant 32-bit data element is shifted by crossbar switch 15 and shifting units 20-7 to 20-4 in the same way as shown in FIG. 4B. However, for the least significant 32-bit data element the distance parameter dist[5:0] is '001100', and so signals L3-L0 and R3-R0 are controlled in the way shown in FIG. 3 for control signal values size=10, shf_I=1 and dist[5:3]=001. As dist[2:0] is '100' (i.e. x=4), shifting units 20-3 to 20-0 select bits [11:4] of the 16 bits provided from the crossbar switch 15. For example, shifting unit 20-3 receives input bytes i2 and i1 (in[23:8]), and bits [11:4] of these 16 bits correspond to bits [19:12] of the original input value. The other shifting units 20-2 to 20-0 operate in the same way as for shifting unit 20-3, so that the result is a 32-bit data element which has been left-shifted by 12 bit positions (bit [19] of the input value in is now at bit position [31] of the shifted value).

Figure 4D:
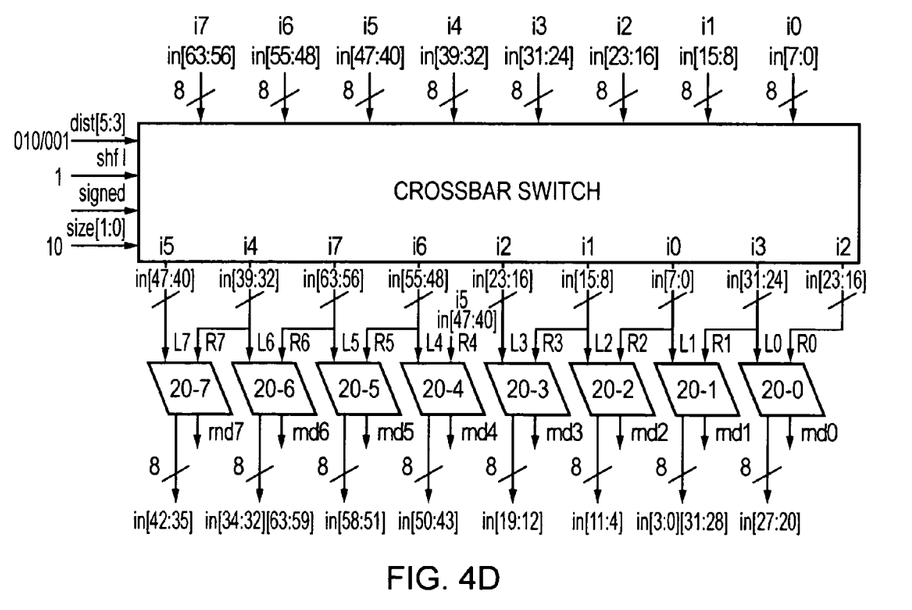

FIG. 4D shows an example of a left-rotate operation for rotating two 32-bit data elements. As in FIG. 4C, the upper data element is shifted by 21 bit positions and the lower data element is shifted by 12 bit positions, but this time the rotate operation means that the shifted-in bits at the least significant end of each data element are filled by the bits which have been shifted out of the most significant end of the data element. Hence, instead of inputting bytes of '0' bit values at the least significant end of each data element as in FIG. 4C, the crossbar switch 15 inputs input bytes i7, i6, i3, i2 from the upper end of each input data element as shown in the corresponding parts of FIG. 3. Otherwise, the operation of the shifting units 20 is the same as in FIG. 4C, and the result is two 32-bit data elements, one of which has been left-rotated by 21 bit positions and the other of which has been left-rotated by 12 bit positions.

Figure 4E:
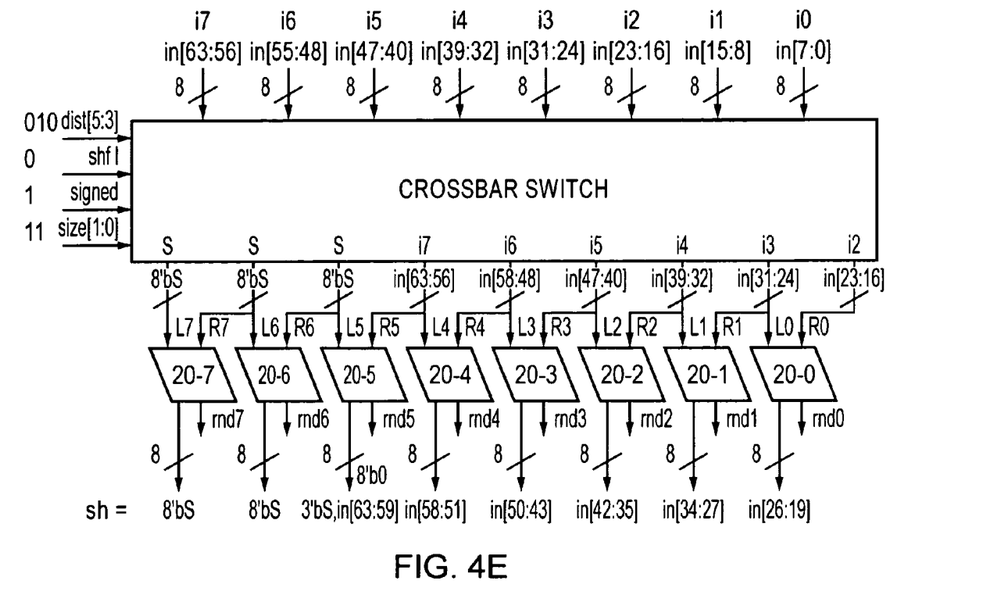

FIG. 4E shows an example of a right-shift operation for shifting a 64-bit data element to the right by 19 places (i.e. dist[5:0]='010011'). The input bytes i0-i7 are mapped to the left-hand and right-hand inputs L, R of the shifting units 20 in the way shown in FIG. 3 for control signal values of size=11, shf_I=0, and dist[5:3]=010. As the "signed" parameter is 1 and a non-rotated shift is being performed, sign bits S are supplied to inputs L7, R7, L6, R6, L5 as indicated in FIG. 3, to represent the shifted-in bits which will fill the upper portion of the shifted value sh. The sign bits S have a value of 1 if the input value in is negative and a value of 0 if the input value in is positive. As mentioned above, for a right shift each shifting unit 20 selects bits [7+x: x] of the 16 bits provided by crossbar switch 15, where x is the decimal value corresponding to bits [2:0] of the distance parameter. As dist[2:0]='011', x=3 and each shifting unit 20 selects bits [10:3]. For example, shifting unit 20-3 receives as its 16 bits in[55:40], and bits [10:3] of these bits are selected to give an output byte of in[50:43]. The other shifters work in a similar way. As shown in FIG. 4E, the result is a shifted value in which the entire 64-bit data element has been shifted to the right by 19 places (i.e. bit [19] of the input value now appears at bit position [0] in the shifted value), with the upper 19 bits being filled with sign bits S. The rounding bit rnd0 would be determined based on the shifted-out bits in[18:0] of the input value which no longer appear in the shifted value. For example, rounding bit rnd0 may be set equal to in[18], the most significant shifted-out bit.

Figure 4F:
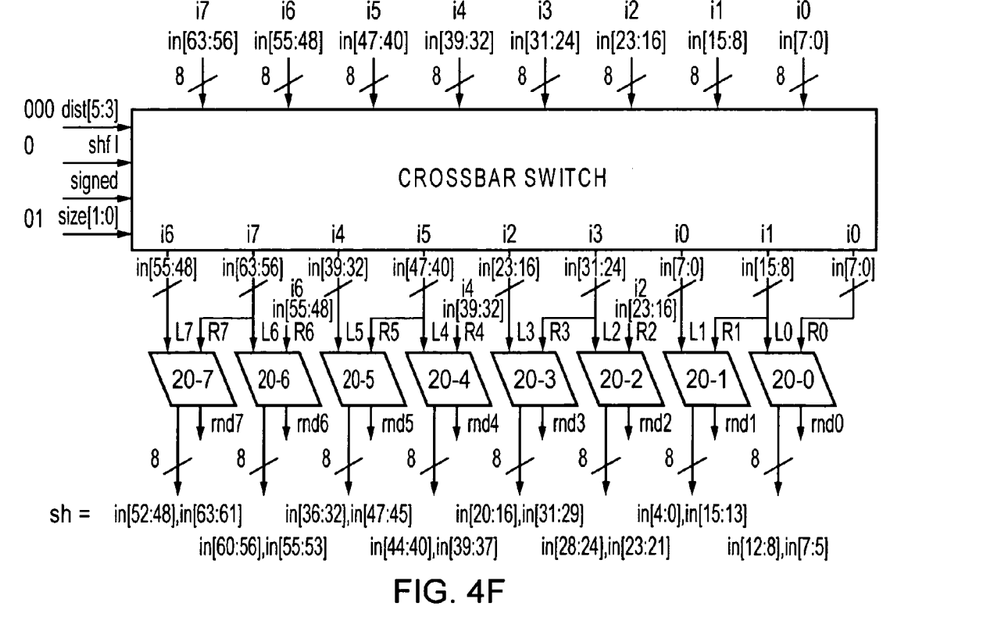

FIG. 4F shows an example of right-rotating four 16-bit data elements by 5 bit positions (i.e. dist[5:0]='000101'). The crossbar switch 15 controls the inputs L7-L0, R7-R0 of the shifting units 20 in the way shown in FIG. 3 for dist[5:3]='000', shf_I=0, size='01'. As a rotate operation is being performed, the left-most shifter input L7, L5, L3, L1 for each 16-bit data element is provided with the input byte i6, i4, i2, i0 from the lower end of the corresponding data element, to allow the shifted-out bits to be input as shifted-in bits. As dist[2:0]='101', i.e. x=5, each shifting unit 20 selects bits [12:5] of the 16 bits provided and outputs the selected bits. As shown in FIG. 4F, the result is a shifted value sh comprising 4 rotated 16-bit data elements, in which the lower 5 bits of the corresponding input data element have been shifted out of the least significant end of the data element and reintroduced at the most significant end of the data element. For a rotation, no rounding bit would be calculated (that is, the rounding bits rnd would all have a value of 0), because none of the original data gets shifted out of the result (the least significant bits of the data value, which would normally be used to determine the rounding bit, have been rotated into the most significant bits of the shifted value).

Clearly, many other examples of shift operations are possible using the shifting circuitry of FIG. 2.

Figure 5:
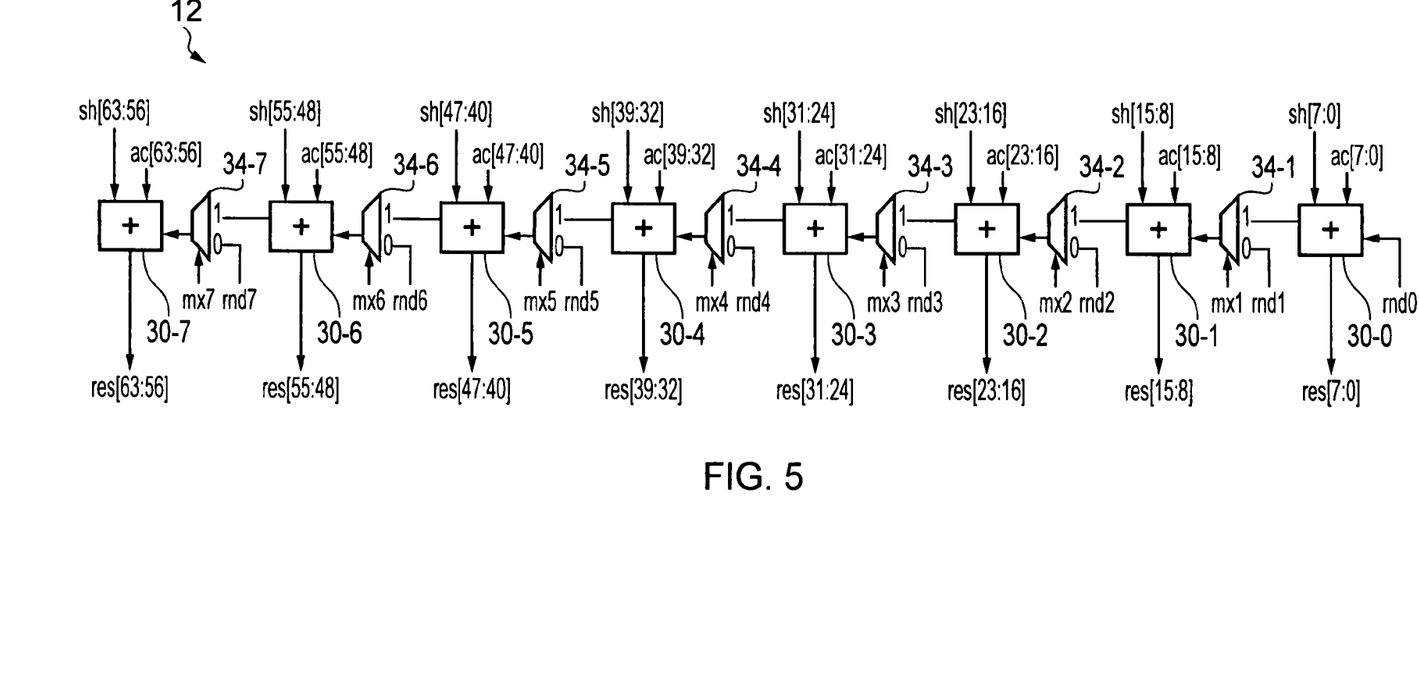
FIG. 5 shows an example of adding circuitry.

FIG. 5 shows an example of adding circuitry 12 for enabling a SIMD operation to be performed on multiple data elements. The adding circuitry 12 comprises a chain of adding units 30 which each add a rounding bit rnd to the sum of 8-bit portions of the shifted value sh and accumulate value ac to generate a corresponding 8-bit portion of the result value res. The adding units 30 may operate individually on 8-bit data elements or may be grouped together in pairs, fours or eights to operate on 16, 32 or 64-bit data elements.

The adding circuitry 12 also includes multiplexers 34 coupled between adjacent adding units 30. Each multiplexer 34 controls which value is input to the carry input of a following adding unit 30 in the chain of adding units (the adding unit 30-0 operating on the least significant 8-bit portion of the shifting value sh does not have a corresponding multiplexer). The multiplexers 34 are controlled by control signals mx1 to mx7. Based on the corresponding control signal, each multiplexer 34 selects whether the corresponding rounding value rnd or the carry output of the preceding adding unit 30 should be input at the carry input of the following adding unit 30 in the chain. For example, multiplexer 34-1 receives the rounding value rnd1 generated by shifting unit 20-1 and also receives the carry output from adding unit 30-0. If the control signal mx1 has a value of 0, then the rounding value is input into the carry input of adding unit 30-1, because the control signal value of 0 indicates that adding units 30-0, 30-1 operate on different data elements and so a carry between these adding units is not required. Instead, the sum generated by the adding unit 30-1 is rounded using the rounding value rnd1.

On the other hand, if the control signal mx1 has a value of 1, then the carry output from adding unit 30-0 is input to adding unit 30-1 so that the adding units 30-0, 30-1 collectively perform an addition of a 16-bit data element (or a larger data element if further adding units are grouped with adding units 30-0, 30-1). The other multiplexers 34-2 to 34-7 may be controlled in a similar way to multiplexer 34-1. In this way, the adding circuitry 12 can be configured to perform the addition and rounding of the shifted value and the accumulate value for a variety of different data element sizes.

Figure 6:
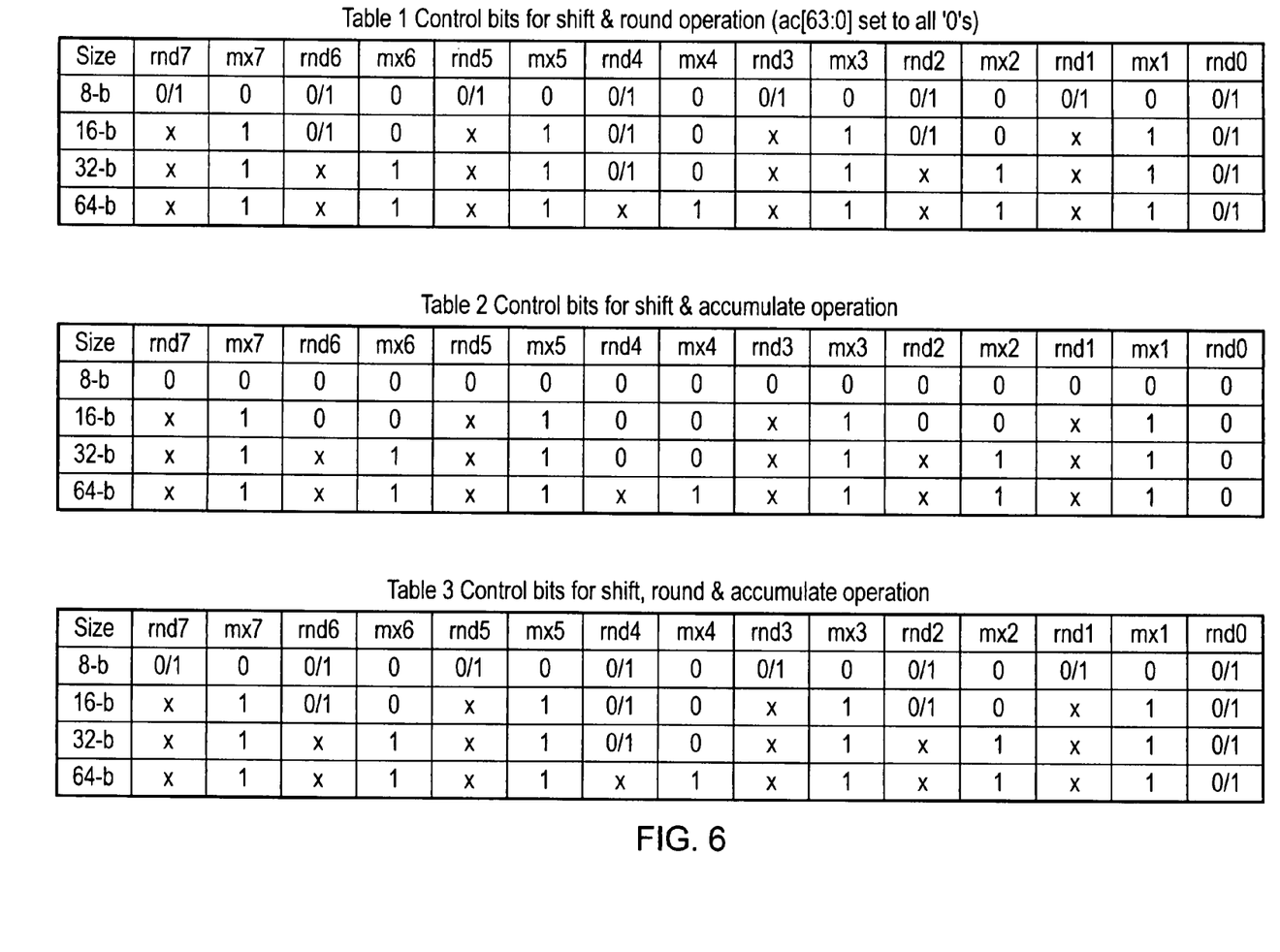
FIG. 6 shows an example of control bits for controlling the operation of the adding circuitry of FIG. 5.

FIG. 6 shows tables showing values of the control signals mx1 to mx7 and the rounding values rnd0 to rnd7 for different data element sizes. Table 1 shows the control bits for a shift-and-round operation. Table 2 shows the control bits for a shift-and-accumulate operation. Table 3 shows the control bits for a shift-round-and-accumulate operation. As shown in Tables 1-3, the control signals mx1-mx7 are the same for all three operations. For the shift-and-round operation the accumulate value ac[63:0] is set to zero, while for the shift-and-accumulate operation the rounding values rnd0-rnd7 are all set to zero. An 'x' in the table denotes either a '0' or a '1'—in such cases the operation of the circuit is independent of the value taken by the signal indicated with the 'x'.

In each case, if 8-bit data elements are being processed then all the control signals mx1 to mx7 have a value of zero to indicate that the adding units 30 should operate independently. Hence, all the multiplexers 34 of the adding circuitry 12 input the rounding value rnd0-rnd7 into the corresponding adding unit 30.

On the other hand, FIG. 6 shows that for data elements of a larger size, some of the control signals mx1 to mx7 are set to 1 to indicate which adding units 30 should operate as a group. For multiplexers positioned between adding units operating on different portions of the same data element, the corresponding control signal is set to a value of 1, and the corresponding rounding value may take any value (indicated by an x in Tables 1 to 3) since the corresponding multiplexer 34 of FIG. 5 will select the carry output, not the rounding value. On the other hand, for multiplexers 34 of the adding circuitry 10, 12 located between two shifting or adding units operating on different data elements, the corresponding control signal is set to 0 and the corresponding rounding value then takes a value of 0 or 1 depending on the rounding value generated by the corresponding shifting unit 20. Therefore, by selecting different combinations of control bits as shown in FIG. 6, different data elements sizes can be processed.

Figure 7:
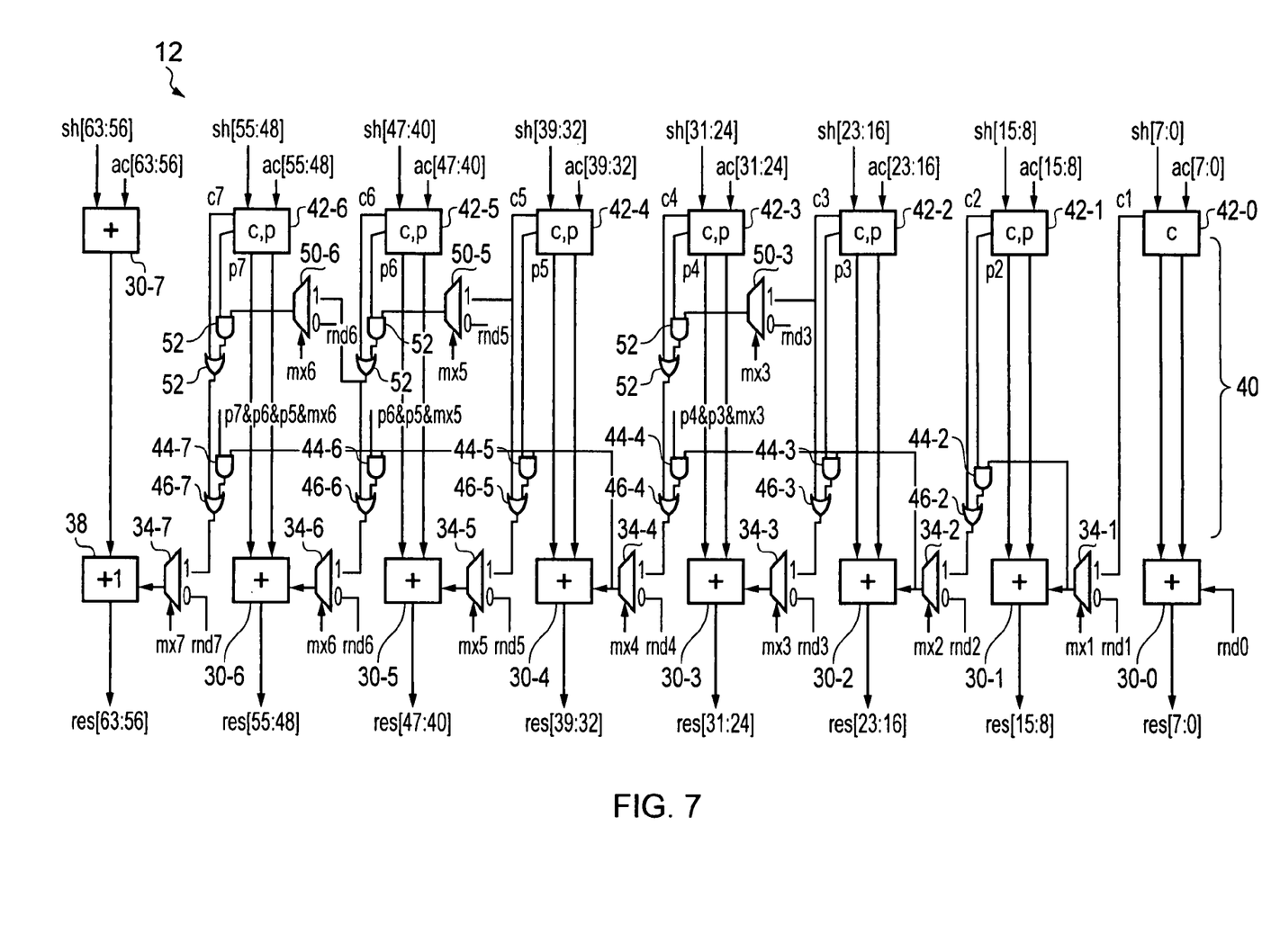
FIG. 7 shows a second example of adding circuitry having carry forwarding circuitry for forwarding carry bits to bypass at least one adding unit of the adding circuitry.

FIG. 7 shows a second example of the adding circuitry 12 in which the adding units 30 and multiplexers 34 are arranged in a similar way to in FIG. 5. To speed up addition, carry forwarding circuitry 40 is provided which allows carry bits to be forwarded between non-adjacent adding units 30, bypassing some adding units. The carry forwarding circuitry 40 includes several carry determining units 42 each corresponding to a different adding unit 30 and a set of AND gates 44, OR gates 46 and multiplexers 50.

The carry determining units 42 determine the carry value c which would result from the addition performed by the corresponding adding unit 30, in the absence of any incoming carry bit for that adding unit 30. For example, the carry determining unit 42-1 examines the shifted value sh[15:8] and the accumulate value ac[15:8], determines the carry bit c1 that results from this addition (assuming no carry in), and passes the carry bit c1 to multiplexer 34-2. The other carry determining units 42-0 to 42-6 perform similar processing.

Also, the carry determining units 42 each determine a carry propagation value p (except for the first carry determining unit 42-0 which corresponds to the adding unit 30-0, which will not receive a carry from another adding unit). The carry propagation value p indicates whether the carry generated by the corresponding adding unit will have the same value as the carry bit input to that adding unit from the preceding adding unit.

For example, carry determining unit 42-4 corresponds to adding unit 30-4 and determines a carry propagation value p5 indicating whether the addition performed by adding unit 30-4 is such that the carry input to adding unit 30-5 will have the same value as the carry output from adding unit 30-3. Carry determining unit 42-4 applies a bitwise exclusive OR operation to the portions of the shifted value and the accumulate value being added by the corresponding adding unit 30-4. If XOR(sh[39:32], ac[39:32]) results in a value whose bits all equal 1, then p5=1 indicating that the carry generated by adding unit 30-4 would have the same value as the carry value generated by adding unit 30-3. This means that the carry can be forwarded directly from adding unit 30-3 to adding unit 30-5 bypassing adding unit 30-4.

On the other hand, if XOR (sh[39:32], ac[39:32]) results in a value which includes some bits having a value of 0, then p5=0 indicating that the carry bit output by adding unit 30-4 will be independent of the carry output by adding unit 30-3. In this case, the carry bit to be input into the following carry unit 30-5 will have the carry value c5 determined by carry determining unit 42-4. Hence, the carry value c5 can be input directly to the multiplexer 34-5 for adding unit 30-5 without waiting for the carry to actually propagate through from adding unit 30-3 to adding unit 30-5.

Hence, irrespective of whether the carry propagation value p is 1 or 0, the operation of the adding circuitry can be speeded up, since when p=1, the carry value from a first adding unit can bypass an intervening unit to be input to a second adding unit, while when p=0 then the carry value c determined in advance is input to the following adding unit without waiting for the corresponding adding unit to actually perform the addition.

AND gates 44, OR gates 46 and multiplexers 50 are provided for controlling the carry forwarding. Each AND gate 44 receives as inputs the carry output from an earlier adding unit and one or more carry propagation values p for one or more intervening adding units that may be bypassed by the carry output from the earlier adding unit. Hence, the output of the AND gate 44 is high only if the carry output from the earlier adding unit is high and the carry propagation values p for all intervening adding units are high. This ensures that the carry bit from the earlier adding unit can only be forwarded to a later adding unit, bypassing the intervening adding units, if the carry propagation values p for all the intervening adding units indicate that, for each intervening unit, the carry bit input to the intervening adding unit is the same as the carry bit output from the intervening adding unit.

The output of each AND gate 44 is passed to a corresponding OR gate 46, which also receives as a second input the carry bit c generated by the corresponding carry determining unit 42. The output of the OR gate 46 is high if either the carry bit c or the output of the AND gate 44 is high. The output of the OR gate 46 is supplied to the multiplexer 34 controlling the carry input to the following adding unit 30. Hence, if the output from the AND gate 44 is high, indicating that a carry has bypassed at least one intervening unit, then this carry can be input to the multiplexer 34 without waiting for the addition to be performed by the intervening adding unit(s), while otherwise the OR gate 46 supplies the carry bit c calculated by the carry determining unit 42 to the multiplexer 34. This enables the addition to be performed more quickly.

Some of the AND gates 44-4, 44-6, 44-7 control bypassing of two or more adding units. These AND gates 44-4, 44-6, 44-7 also receive the multiplexer control signal mx3, mx5, mx6 corresponding to the preceding adding unit, so that carry forwarding can be prevented if the multiplexer control signal mx3, mx5, mx6 equals 0, indicating that the rounding value rnd, not a carry value, will be input at the carry input of the preceding adding unit and so carries should be halted. Extra multiplexers 50-3, 50-5, 50-6 and gates 52 are also provided to allow the rounding value to be inserted at these points.

Adding unit 30-7, which adds the most significant portion of the data values, is arranged in a different way in FIG. 7 in comparison to FIG. 5. Unlike in FIG. 5, the adding unit 30-7 is not connected to the corresponding multiplexer 34-7. Instead, the adding unit 30-7 adds the upper portions of the data values sh[63:56] and ac[63:56] and outputs the sum to an incrementer 38. The incrementer 38 increments the sum by 1 if the output of multiplexer 34-7 is high (indicating that either a carry has been received from an earlier adding unit or that a rounding value of 1 is to be added), and does not increment the sum if the output of multiplexer 34-7 is low. Since adding unit 30-7 is the final adding unit in the chain, there is no need to determine a carry bit c or carry propagation value p. By moving the adding unit 30-7 upstream of the incrementer 38, the addition can be performed in parallel with operations performed by earlier adding units, so that, other than waiting to see whether an increment is required at incrementer 38, it is not necessary to wait for the results of other units before performing the addition of sh[63:56] and ac[63:56].

It is possible to design the adding circuit of FIG. 7 so that each column resembles adding unit 30-7 and incrementer 38. In this case, the carry determining units 42 for determining the values c, p would also perform an 8-bit addition of corresponding portions of the shifted value sh and accumulate value ac, with the sum of these values then being incremented by the output of the corresponding multiplexer 34, in a similar way to the way in which the output of adding unit 30-7 is incremented by incrementer 38.

In summary, the carry forwarding circuitry 40 includes carry determining units 42 which determine a carry bit c in advance of the actual addition performed by the corresponding adding unit 30, and a carry propagation value p which indicates whether a carry received from a preceding adding unit in the sequence will ripple right through the corresponding adding unit to cause a carry to be output to the following adding unit. These values can then be used to control whether carries can be forwarded between non-adjacent adding units, without waiting for intervening adding units 30 to actually perform the addition. This speeds up the addition operation, allowing the shift-round-and-accumulate operation to be performed in a shorter processing cycle, and therefore enabling improved processing performance. It will be appreciated that there are many ways in which carries can be forwarded and different carry forwarding schemes may be used to those shown in FIG. 7.

Figure 8:
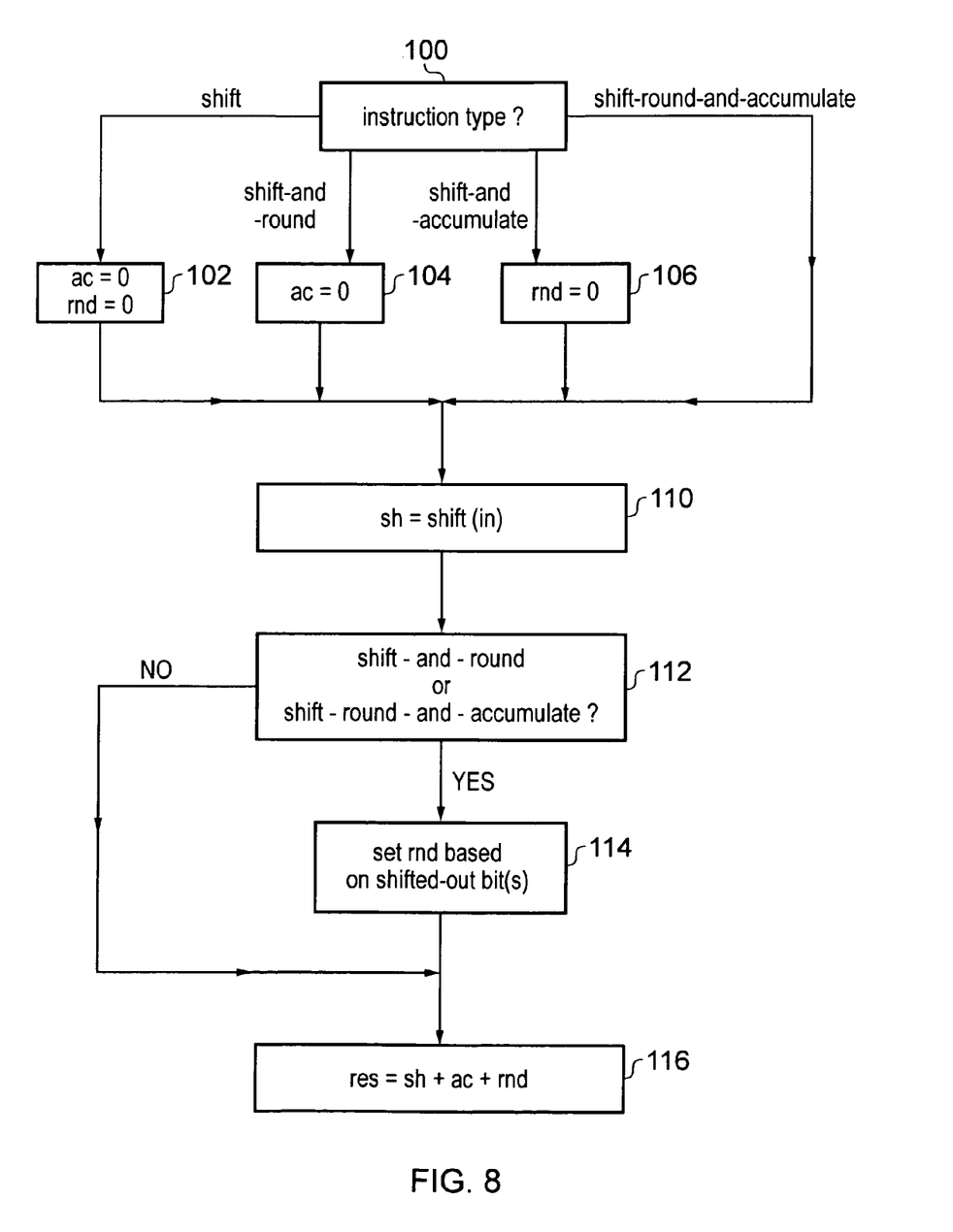
FIG. 8 shows a method of performing shift, round and accumulate operations.

FIG. 8 shows an example of a method of performing shift, round and accumulate operations. At step 100 the control circuitry 6 determines which type of instruction is being executed. If the instruction is a shift instruction, then at step 102 the accumulate value ac and the rounding value rnd are set to zero. If the instruction is a shift-and-round instruction, then at step 104 the accumulate value ac is set to zero. If the instruction is shift-and-accumulate instruction, then at step 106 the rounding value rnd is set to zero. On the other hand, if the instruction is a shift-round-and-accumulate instruction then none of the operands are set to zero. The method then proceeds to step 110, where the operation is performed in the same way for each type of instruction.

At step 110, the shifting circuitry 10 shifts the input value to generate the shifted value sh. At step 112, it is determined whether the instruction requires rounding to be performed (i.e. whether the instruction is a shift-and-round or shift-round-and-accumulate instruction). If so, then at step 114 the rounding value rnd is set based on one or more shifted-out bits which no longer appear in the shifted value sh following the shift applied by the shifter 10. If rounding is not required then step 114 is skipped and the rounding value rnd is zero. At step 116, the adding circuitry 12 adds the shifted value sh to the accumulate value ac and the rounding value rnd, to generate the result value res.

If a SIMD operation is being performed on multiple data elements, then each data element would be processed in parallel according to the operations shown in steps 110 to 116. The control bits shown in FIG. 6 control the way in which the adding units 30 are configured to perform the adding operation on different sizes of data elements.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   processing circuitry comprising shifting circuitry for shifting data values and adding circuitry for adding data values; and
   control circuitry configured to control said processing circuitry to perform a shift-round-and-accumulate operation in response to execution of a shift-round-and-accumulate instruction;
   said shift-round-and-accumulate operation comprising:
   (i) shifting an input value to generate a shifted value using said shifting circuitry;
   (ii) adding said shifted value to an accumulate value using said adding circuitry; and
   (iii) performing rounding by adding a rounding value to the sum of said shifted value and said accumulate value using said adding circuitry;
   wherein said adding circuitry is configured to add the shifted value to the accumulate value and add the rounding value in the same processing cycle.

2. The data processing apparatus according to claim 1, wherein said adding circuitry comprises a carry input and said rounding value is input to said carry input as a carry bit to be added to a least significant bit of the sum of said shifted value and said accumulate value.

3. The data processing apparatus according to claim 1, wherein said control circuitry is configured to control said processing circuitry to use a result value of said shift-round-and-accumulate operation as said accumulate value for a following shift-round-and-accumulate operation.

4. The data processing apparatus according to claim 1, wherein said rounding value has a value dependent on at least one shifted-out bit of said input value that is not present in said shifted value generated by said shifting circuitry.

5. The data processing apparatus according to claim 1, wherein said control circuitry is configured to control said processing circuitry to perform a shift-and-round operation in response to execution of a shift-and-round instruction;
   said shift-and-round operation comprising performing said shift-round-and-accumulate operation with said accumulate value equal to zero.

6. The data processing apparatus according to claim 1, wherein said control circuitry is configured to control said processing circuitry to perform a shift-and-accumulate operation in response to execution of a shift-and-accumulate instruction;
   said shift-and-accumulate operation comprising performing said shift-round-and-accumulate operation with said rounding value equal to zero.

7. The data processing apparatus according to claim 1, wherein said control circuitry is configured to control said processing circuitry to perform a shift operation in response to execution of a shift instruction;
   said shift operation comprising performing said shift-round-and-accumulate operation with said accumulate value and said rounding value both equal to zero.

8. The data processing apparatus according to claim 1, wherein said input value, said shifted value and said accumulate value each comprise at least one data element, and said processing circuitry is configured to apply said shift-round-and-accumulate operation in parallel to each data element of said input value, said shifted value and said accumulate value to generate a result value comprising at least one data element.

9. The data processing apparatus according to claim 8, wherein said control circuitry is configured to select the number of data elements and the size of the data elements in dependence on a variable parameter of the shift-round-and-accumulate instruction.

10. The data processing apparatus according to claim 8, wherein said shifting circuitry comprises a plurality of shifting units, each shifting unit configured to operate on at least a portion of a data element of said input value to generate at least a portion of a data element of said shifted value.

11. The data processing apparatus according to claim 8, wherein, for each data element of said shifted value, said shifting circuitry is configured to generate a corresponding rounding value in dependence on at least one shifted-out bit of a corresponding data element of said input value that is not present in the data element of said shifted value.

12. The data processing apparatus according to claim 8, wherein said adding circuitry comprises a plurality of adding units, each adding unit configured to operate on at least a portion of a data element of said shifted value and said accumulate value to generate at least a portion of a data element of said result value.

13. The data processing apparatus according to claim 12, wherein said adding units are connected in a chain with a carry input of a following adding unit configured to receive a carry output value of a preceding adding unit.

14. The data processing apparatus according to claim 13, wherein said chain of adding units comprises at least one multiplexer configured to select whether to input to the carry input of a following adding unit:
   (i) said carry output value of a preceding adding unit; or
   (ii) said rounding value.

15. The data processing apparatus according to claim 14, wherein said control circuitry is configured to control said at least one multiplexer to:
   (i) input said carry output value to the carry input of said following adding unit if said preceding adding unit and said following adding unit are operating on different portions of the same data element; and
   (ii) input said rounding value to the carry input of said following adding unit if said preceding adding unit and said following adding unit are operating on different data elements.

16. The data processing apparatus according to claim 12, comprising carry forwarding circuitry configured to forward a carry output value of a first adding unit to the carry input of a second adding unit bypassing an intervening adding unit.

17. The data processing apparatus according to claim 16, wherein said intervening adding unit comprises a carry determining unit configured to determine a carry propagation value having one of:
   (i) a first value indicating that the carry output value of said intervening adding unit is dependent on, and has the same value as, the carry output value of said first adding unit; and
   (ii) a second value indicating that the carry output value of said intervening adding unit is independent of the carry output value of said first adding unit.

18. The data processing apparatus according to claim 17, wherein said carry forwarding circuitry is configured to forward the carry output value of said first adding unit to said carry input of said second adding unit bypassing said intervening adding unit if said carry propagation value has said first value.

19. The data processing apparatus according to claim 17, wherein said carry determining unit is configured to determine the carry output value which results from the addition performed by said intervening adding unit; and said carry forwarding circuitry is configured to pass the carry output value determined by said carry determining unit to the carry input of said second adding unit if said carry propagation value has said second value.

20. The data processing apparatus according to claim 17, comprising at least two intervening adding units between said first adding unit and said second adding unit, each intervening adding unit comprising said carry determining unit;

wherein said carry forwarding circuitry is configured to forward the carry output value of said first adding unit to said carry input of said second adding unit bypassing said at least two intervening adding units if said carry propagation value for each of said at least two intervening adding units has said first value.

21. A data processing apparatus comprising:

processing means for processing data, said processing means comprising shifting means for shifting data values and adding means for adding data values; and control means for controlling said processing circuitry to perform a shift-round-and-accumulate operation in response to execution of a shift-round-and-accumulate instruction;

said shift-round-and-accumulate operation comprising:
(i) shifting an input value to generate a shifted value using said shifting means;
(ii) adding said shifted value to an accumulate value using said adding means; and
(iii) performing rounding by adding a rounding value to the sum of said shifted value and said accumulate value using said adding means;

wherein said adding means is configured to add the shifted value to the accumulate value and add the rounding value in the same processing cycle.

22. A method of performing a shift-round-and-accumulate operation, comprising steps of:
(i) shifting an input value to generate a shifted value;
(ii) adding said shifted value to an accumulate value; and
(iii) performing rounding by adding a rounding value to the sum of said shifted value and said accumulate value;

wherein said adding of said shifted value to said accumulate value and said adding of said rounding value are performed by the same adding circuitry in the same processing cycle; and said method is performed in response to execution of a shift-round-and-accumulate instruction.

* * * * *